(12) United States Patent
Raffo

(10) Patent No.: US 7,890,924 B2
(45) Date of Patent: Feb. 15, 2011

(54) SYSTEM AND METHOD FOR SIMULATING PRODUCT DESIGN AND DEVELOPMENT

(75) Inventor: David M. Raffo, Durham, OR (US)

(73) Assignee: State of Oregon acting by and through the State Board of Higher Education on behalf of Portland State University, Portland, OR (US)

( * ) Notice: Subject to any disclaimer, the term of this patent is extended or adjusted under 35 U.S.C. 154(b) by 1120 days.

(21) Appl. No.: 10/838,494

(22) Filed: May 3, 2004

(65) Prior Publication Data

US 2005/0160103 A1     Jul. 21, 2005

Related U.S. Application Data

(60) Provisional application No. 60/538,062, filed on Jan. 20, 2004.

(51) Int. Cl.
     *G06F 9/44*     (2006.01)
(52) U.S. Cl. ..................... 717/105; 717/100; 717/113; 717/135
(58) Field of Classification Search ................ 717/101
See application file for complete search history.

(56) References Cited

U.S. PATENT DOCUMENTS

| | | | | |
|---|---|---|---|---|
| 6,405,364 | B1 * | 6/2002 | Bowman-Amuah | 717/101 |
| 6,725,445 | B1 * | 4/2004 | Leymann et al. | 717/101 |
| 6,877,153 | B2 * | 4/2005 | Konnersman | 717/100 |
| 6,934,931 | B2 * | 8/2005 | Plumer et al. | 717/104 |
| 7,240,328 | B2 * | 7/2007 | Beckett et al. | 717/113 |
| 7,506,302 | B2 * | 3/2009 | Bahrami | 717/100 |
| 7,797,674 | B1 * | 9/2010 | Brewton et al. | 717/105 |

OTHER PUBLICATIONS

Microsoft Project Version 4.1 User's Guide, 1995, Whole Manua.*
Software Engineering Risk Management Finding Your Path Through the Jungle, Version 1.0, Reference Guide for Software Product, Dale Walter Karolak, 1998, Whole Manual.*
Software Process Support over the Internet, F. Maurer et al, ACM, 1999, pp. 642-645.*
"Six Sigma and Simulation, So What's the Correlation,?", David M. Ferrin et al, ACM, Dec. 2002 pp. 1439-1443.*

(Continued)

*Primary Examiner*—Thuy Dao
(74) *Attorney, Agent, or Firm*—Klarquist Sparkman, LLP

(57) ABSTRACT

A generalized software process simulation model is utilized to simulate software engineering processes and support project management and control. The simulation model takes advantage of generic software modeling blocks which represent differing stages or activities in a software development process and are represented in modeling environment. The generic software modeling blocks are also used to represent sub-processes and activities within higher-level processes. The blocks also provide dialog boxes which allow entering and adjustment of data and equations. Through manipulation of blocks and comparisons of simulations, a project manager can simulate and observe the outcome of different process decisions. Additional simulation capabilities are possible, as software engineering is one example of the technology. Similar techniques are also applied to simulation of hardware and systems development, and other product or technology development which follows design and development characteristics similar to software engineering.

43 Claims, 12 Drawing Sheets

OTHER PUBLICATIONS

Dale Walter Karolak, "Software Engineering Risk Management", Nov. 1, 1995, Whole Book.*

"A Hybrid Software Process Simulation Model for Project Management", P. Lakey, ProSim03 May 4, 2003. Online retrieved at <prosim.pdx.edu/prosim2003/paper/prosim03_lakey.pdf>.*

"ProSim03 Program Schedule", May 3, 2003. Online retrieved at <http://prosim.pdx.edu/prosim2003/program.htm>.*

"The Extend Simulation Environment", D. Krahl, Dec. 2000, pp. 280-289. Online retrieved at <http://www.extendsim.com/downloads/papers/WSC2000.PDF>.*

"Software Process Simulation Modeling: Why? What? How?", Kellner et al., Apr. 1999, <http://citeseerx.ist.psu.edu/viewdoc/download?doi=10.1.1.97.9324>.*

"Software process decision support: making process tradeoffs using a hybrid metrics, modeling and utility framework", Raffo et al., Jul. 2002, pp. 803-809, <http://delivery.acm.org/10.1145/570000/568897/p803-raffo.pdf>.*

"A simulation-based approach to software performance modeling", Balsamo et al., Sep. 2003, pp. 363-366, <http://delivery.acm.org/10.1145/950000/940122/p363-balsamo.pdf>.*

"A Knowledge-Based Software Process Simulation Model", Hanakawa et al., Dec. 2002, pp. 383-406, <http://portal.acm.org/citation.cfm?id=590684.590767>.*

* cited by examiner

Fig. 7

Project Statistics (with Total Effort)

Project Name: IEEE12207 SW Development Process Model

| Run Set | Total Effort Mean | Rework Effort Mean | Duration Mean | Corrected Defects Mean | Latent Defects Mean |
| --- | --- | --- | --- | --- | --- |
| | Total Effort SD | Rework Effort SD | Duration SD | Corrected Defects SD | Latent Defects SD |
| 1 No IV&V | 18525.8891916407 | 6662.6977358967 | 4914.9970200277 | 6921.7689054155 | 1301.6729875984 |
| | 3.7838932796867 | 2.1805127916088 | 1.0971463960599 | 2.2612446566445 | 0.4253914901 8052 |
| 2 IV&V On | 17945.2894424603 | 6095.9917323453 | 4931.8880026629 | 6963.1775520796 | 1262.8824935296 |
| | 6.4643653338148 | 3.8271514744612 | 1.7559072373415 | 4.2945148219613 | 0.7959022940 2088 |

GPSM Data Report

Rework Block Dialog Box

Expanded View of Testing Block

US 7,890,924 B2

SYSTEM AND METHOD FOR SIMULATING PRODUCT DESIGN AND DEVELOPMENT

CROSS-REFERENCE TO RELATED APPLICATION

This application claims the benefit of U.S. Provisional Application No. 60/538,062, filed of Jan. 20, 2004.

STATEMENT OF GOVERNMENT RIGHTS

This invention was made with government support under Grant No. NAG5-12736 awarded by the National Aeronautics and Space Administration. The government has certain rights in the invention.

TECHNICAL FIELD

The invention relates generally to managing of computer software, systems and hardware engineering, and product development.

BACKGROUND

Product development and design can be a complex process. One example of such a complex task is the engineering of software. A software development project can involve as few as one person, or as many as hundreds. Development work may be done by a tightly-knit team working in a highly-directed fashion, or may involve coordination amongst many disparate developers, engineers, programmers, managers, and marketers spread over long geographical distances. Additionally, many large-scale development projects are of a complexity rarely seen in other fields. The number of operations in a large piece of software can be greater than even the number of different mechanical parts in a large piece of machinery, such as a plane. This complexity makes detection of errors very difficult, and because many errors can effectively "hide" until special circumstances occur, special error detection techniques often have to be employed to ensure software will operate predictably and correctly. The unique nature of the problem makes it difficult for project managers, when making decisions about the software engineering process, to accurately predict results. This, in turn, makes it very difficult to see the possible success or failure of different processes which may be under consideration and to properly design a development process which will result in the most-efficient and/or highest-quality end product.

To better improve software engineering, and to encourage consistency and predictability in development, generalized software development models have been proposed which prescribe generic methods of developing software. Examples of these models include, but are not limited to: the waterfall model, the rational unified process model, the spiral model, rapid prototyping, and the IEEE 12207 software development standard and others. While some of these models are well known, and while they do provide guidance, they do suffer from flaws. The first is that not every software development project fits easily into one of the existing prescribed development models. Trying to shoehorn a project into a model for which it is not ideally suited may frustrate the efforts of the software developer, and may waste time and resources before even a single requirement is determined. One reason for this is that many models end up forcing developers into a particular development mold rather than to describe a given development situation or to allow developers flexibility to modify and improve the model to best suit their needs.

One example of such an ill fit is the use of the waterfall model under circumstances where there are requirements changes late in the development cycle. This situation may occur when users have only a little familiarity with the type of system that is being proposed and later change their mind, uncovering new requirements late in the development cycle. The use of a waterfall process in this situation, with its strictly-defined sequence of development stages, is problematic because changes cannot be easily incorporated and users to not see a prototype until very late in the development process. A better fit in this situation would be rapid prototyping, where a prototype is put into users hands early, allowing users to clarify what they want. Indeed, many currently-used software development models are based on the waterfall model, with additional modifications made for particular types of development problems. However, this ever-expanding universe of software development models, while meant to broaden the tools available to a software engineer, serves instead to force the engineer to choose between increasingly-narrow development niches, none of which may serve his or her actual needs.

In order to provide a more robust experience, some work has been done to develop software process simulation models ("SPSMs"), which can simulate the activity of software development, utilizing known or discovered relations between software development inputs, such as manpower, quality control review, and time, and outputs such as cost, time and quality. Unfortunately, while a properly-designed SPSM can predict some results for a given modeled software development process, these models are often difficult and time-consuming to create for each process. Additionally, these models, as they are designed to incorporate the complete aspects of a software development process, often require the acquisition of software development metrics data that is difficult to acquire, or may not yet exist. While the problems discussed herein are found in software engineering, they are not specific to that particular product development. In fact, difficulties like these exist for other forms of product development, including, but not limited to, hardware and systems engineering. Some of the same activities in these engineering scenarios, such as design, requirements, analysis, development, and testing, are similar to activities performed in software engineering.

What is needed is a system that provides flexible simulation model creation tools which can quickly be developed or modified for a given system.

SUMMARY

A system for estimating combinations of time, cost, quality, or functionality metrics through modeling a product engineering process is described. In one implementation, a system is described which comprises a library which comprises a plurality of application-customizable generic product engineering building blocks. These blocks are configured to process product engineering data and to allow themselves to be manipulated in a modeling environment. In one implementation, the system is specific to a software engineering process, and comprises generic software engineering building blocks which process software engineering data.

A computer-readable medium is also described which describes a plurality of application-customizable generic product engineering blocks which describe processes measured by cost, time, quality or functionality. In one implementation, the blocks are generic software engineering blocks.

A method of modeling a software engineering process is also described. In one implementation, the method involves accessing a plurality of application-customizable generic software engineering blocks, selecting at least one block, and manipulating the selected block to create a model of a software engineering process.

BRIEF DESCRIPTION OF THE DRAWINGS

FIG. 7 illustrates, in one implementation, an exemplary data report from generated using a generalized software process simulation model.

FIG. 10 illustrates, in one implementation, an interface for manipulating settings or a generic software engineering rework block.

DETAILED DESCRIPTION

Figure 1:
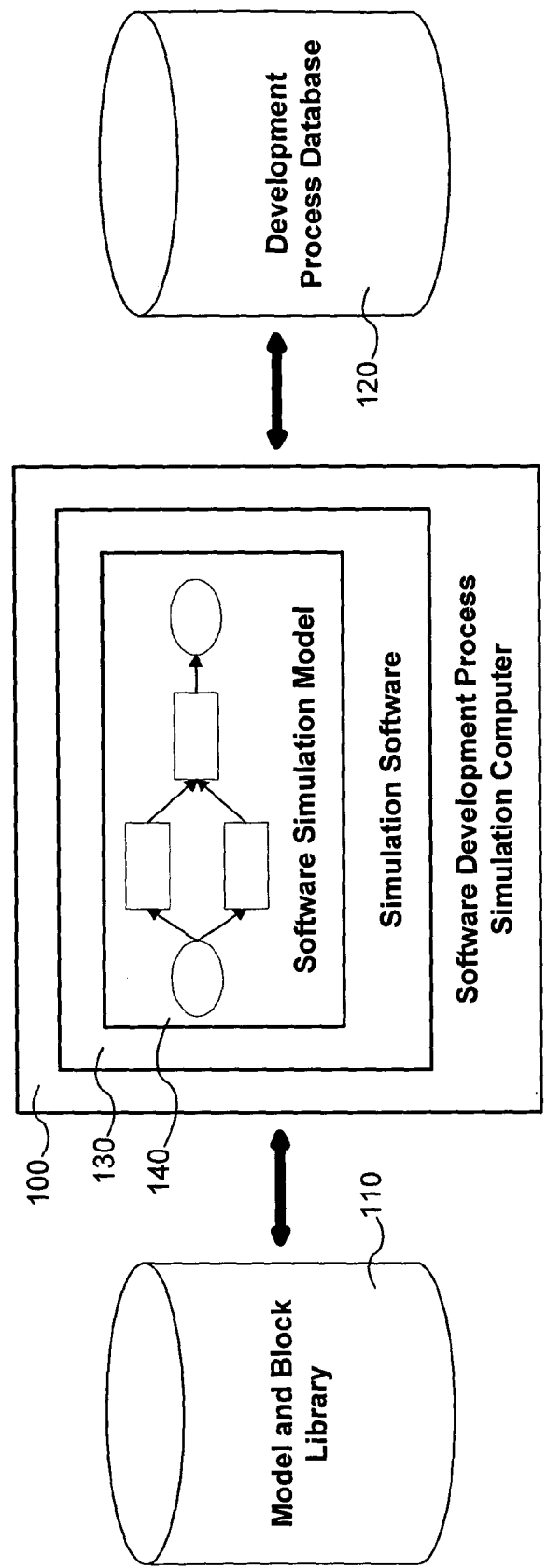
FIG. 1 illustrates, in one implementation, components of a system for creating and utilizing generalized software process simulation models.

The following description is directed to techniques and a system for providing generalized software process simulation models ("GPSMs") utilizing generic software engineering model blocks ("GSMBs"). In one implementation, blocks are designed to be both generic and reusable. In another implementation, blocks are configured to represent discrete software engineering processes. In yet another implementation, block activities are constrained to measurement and computation of specifically-chosen software engineering metric data. Thus, a software developer or engineer can utilize combinations of blocks to create multi-block generalized software process simulation models. This provides a user with the ability to create and modify existing software process models, such as the waterfall model or the IEEE 12207 standard, or to develop his or her own software engineering model from the "basic building blocks" of the GSMBs. In another implementation, a user can attach blocks to an existing GPSM to simulate a concurrent process, such as a verification process. The use of GSMBs in this context provides flexibility and a greater degree of control than would otherwise be lacking using traditional software process models or SPSMs.

While the descriptions below focus on the specific example of software engineering, including conception, requirements analysis, design, development, and testing, the systems and techniques described herein are applicable to other fields which utilize similar engineering processes. Thus, the systems and techniques described herein can be modified to providing simulation models for such activities as hardware and systems engineering, and other product development and engineering that utilizes processes similar to those discussed herein.

1. Coverage of the GPSM

In one implementation, GPSMs are implemented with a limited scope of coverage. In one implementation, limitations are chosen on data metrics which limit simulation to time, cost and quality metrics. In other implementations, additional or alternative limitations may be used, such as functionality. A trade-off may be seen in some implementations between inclusion of many data metrics and ease of GPSM development and use. In one implementation, time, cost, quality, or functionality metrics are chosen as they are more easily measured than other metrics, and provide data which is easily understandable to a project manager. In an alternative implementation, other metrics may be included, such as requirements or functionality metrics.

a. Modularity

Developing GPSMs can offer important benefits in terms of saving time and improving the quality and usability of software simulation models. In one implementation, GPSMs represent differing degrees of software process modularization. Much software is developed in a modularized form, including the designation of logic to differing levels, finding a reusing of logic in tasks, defining logic into modules that reference other modules, and hiding logical complexity behind interfaces. Thus, in one implementation, GPSMs are composed of multiple reusable blocks which can be easily connected together representing relations between software development phases. This property allows a GPSM to easily capture and simulate modular software engineering processes, as well as simulate logic incorporated into software being developed. Finally, modularization provides an understandable interface to a software designer or project manager, by allowing the designer or manager to work with the software process in a discrete modular form, similar to the way he or she designs the software itself.

Simulation modeling is defined by qualitative logic (how the model is assembled) and quantitative data (what data are represented in the model). Thus, in one implementation, GPSM component logic can achieve the associated modularization characteristics described by various works of D. L. Parnas, which include, but are not limited to, such characteristics as partitioning simulation process logic, reducing complexity, protecting logic, and manageable aggregation.

b. Software Families

In one implementation, the concept of "family" as defined by Weiss et al, "Software Product-Line Engineering: A Family-Based Software Development Process", (Addison-Wesley, 1999) is incorporated into the GPSM framework. This involves, in one implementation, the modeling of an organization's software development process within the context of a "family" of products, allowing the modeling of a software product-line, rather than individual software applications. In one implementation of the system, families are incorporated by defining the overall simulation domains by processes being modeled and by the facilities that will be required to promote the development of family members. In another, families are incorporated by including the ability to rapidly create the above-mentioned family members into useable simulation applications that perform within their context. GPSMs make use of abstract process frameworks described by Weiss, by providing for simulation development which can identify families of simulation applications that are worthy of investment, identify the addition of engineering facilities to assist in producing simulation family members, and identify the engineering facilities for producing family members rapidly. By incorporating the family concept, more robust and better-defined models are created than would be otherwise by defining unique models for each simulation situation encountered.

c. Cognitive Patterns

In another implementation, GPSMs synthesize the above concepts by incorporating cognitive patterns from Gardner's work in "Cognitive Patterns: Problem-Solving Frameworks for Object Technology", (Addison-Wesley, 1998). In one implementation, GPSMs incorporate cognitive patterns by using them to define the general processes that define the necessary steps or patterns, called Problem-Solution Templates (PST) by Gardner, for a consistent aspect or solution to a problem. In various implementations, this allows the designer of a GPSM to manage complexity, define the simulation scope and boundaries, create a consistent vocabulary, identify the necessary general simulation components, incorporate the situational knowledge rapidly and generate a consistent and valid model accessible to differing skill levels. In another implementation, the GPSM could be used to predict the impact of process changes.

2. Components of a GPSM System

FIG. 1 illustrates one implementation of a system for creating and utilizing GPSMs. In FIG. 1, a simplified GPSM is illustrated as software simulation model 140. In other implementations, GPSMs can be created which simulate hardware or systems engineering, or other product development. While the discussion below with respect to FIGS. 1-11 is geared toward the particular example of software engineering, the techniques and systems are similarly useful for hardware and systems engineering, as well as product development.

In the illustrated implementation, the system executes on a software development process computer 100. As will be described below, the GPSM system can, in various implementations, be executed on various general or special purpose computers. In the illustrated embodiment, the computer 100 communicates with a model and block library 110. In one implementation, the model and block library 110 comprises data which describes pre-made GPSMs and GSMBs which can be retrieved and used to either as models for entire software development processes or for discrete simulated processes within a software development process. In another implementation, a user can store GPSMs and GSMBs that he or she has created or modified in the library 110, for future use.

The existence of the library increases efficiency for software project managers. By providing an accessible storage area for the various pre-made GPSMs and GSMBs, the GPSM system illustrated in FIG. 1 allows a high degree of freedom for a project manager to pick and choose from numerous modeling choices and to easily compare between the different choices. Additionally, by allowing a user to store modeling components, the system allows a user to develop and refine software development models over a period of time. Because a stored model can be retrieved, the GPSM system allows a user to react to requirement or resource changes as they happen, to model and test development possibilities, and to store any modifications to facilitate later simulation. In one implementation, the model and block library 110 can comprise a separate storage medium containing data files describing various GPSMs and GSMBs. In another, the model and block library 110 comprises one or more files, stored on the computer 100, which describe models and modeling blocks.

FIG. 1 also illustrates a development process database 120 which communicates with computer 100. In one implementation, the database 120 comprises a database which describes parameters which will be used by the software development process simulation computer 100 to control software development simulation. In various implementations, this data can include, but is not limited to, such parameters as feature numbers, manpower, productivity, defect injection rates, defect detection rates, labor costs, and time costs. In another implementation, the development process database also acts as a repository for results from software development simulations, receiving data such as development cost, development time, or product defects. In one implementation, the database 120 comprises a standard database; in another the database comprises one or more spreadsheets which comprise data contained in particular spreadsheet cells.

FIG. 1 also illustrates simulation software 130, which facilitates both the simulation of the GPSMs as well as the direct manipulation of GSMBs to create and modify GPSMs. In one implementation, the simulation software comprises the Extend software application by Imagine That, Inc. In one preferred implementation, the simulation software allows a user to directly manipulate modeling components, in this case the GSMBs, through its graphical user interface. In another preferred implementation, the simulation software 130 performs the actions of simulation using configured simulation modeling blocks, as will be understood. The simulation software 130 contains and allows manipulation of a GPSM, illustrated in FIG. 1 as the software simulation model 140. In one implementation, the simulation software loads the GPSM into local memory of the computer 100 in order to allow software process simulation and modification of the GPSM directly. In another implementation, the simulation software 130 leaves all or part of the GPSM in the model and block library 110, and communicates with the library in order to perform simulation and model development functions.

Figure 2:
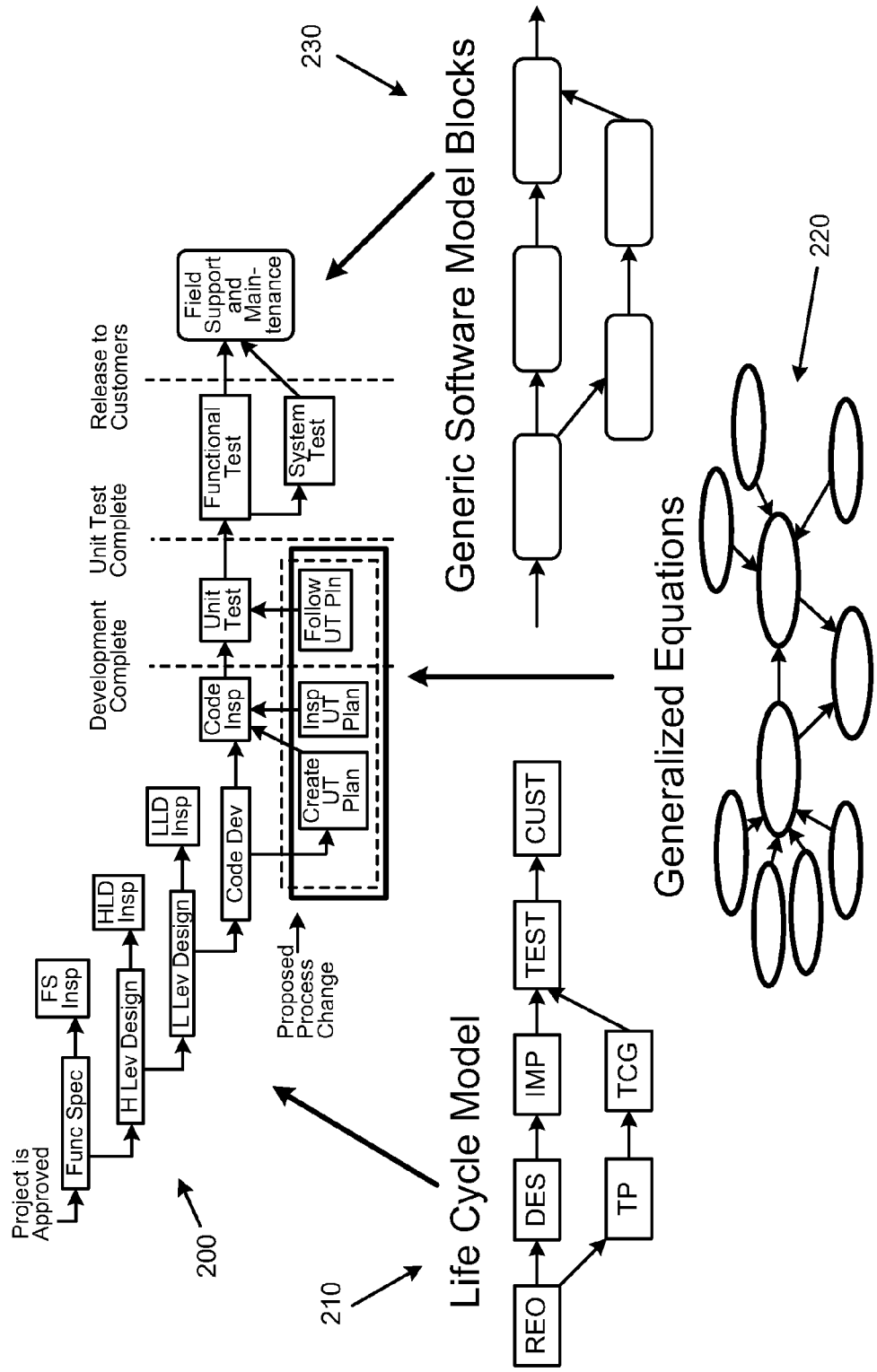
FIG. 2 illustrates, in one implementation, components of a generalized software process simulation model which is used to model a software development process.

FIG. 2 illustrates, in one implementation, components of a software development process modeled by a GPSM 200. FIG. 2 illustrates how, in one implementation, the GPSM combines multiple aspects of a software development process model. The basis for the general form of the model, in the illustrated implementation, is the life cycle model 210 of software development, which comprises multiple discrete process stages including requirement analysis, software design, implementation, testing, and customer release. In alternate implementations, different SPSMs are used. Additionally, models similar to the life cycle model 210 can be used which describe hardware or systems engineering processes, or which describe the development of a product. Using these models, a generalized simulation model for such engineering or development can be created which is not particular to the software field. Another component illustrated in FIG. 1 are generalized equations 220. In one implementation, these are created through investigation of a particular software developer's engineering practices. In another, they are created by third-parties, through academic or commercial research, and are acquired by a software developer for use in a GPSM. In yet another implementation, the generalized equations are incorporated into the GSMBs before the time of creation of a GPSM.

In the illustrated implementation, the stages of the life cycle model 210 are simulated using the generic process blocks 230, which, in one implementation are GSMBs. By using the GSMBs to simulate the various stages and connections of the life cycle model a simulation model can be created which, by allowing data to flow through the model according to the generalized equations 220, simulates the processes of the software development model. In one implementation this data includes such metrics as defect introduction rate, defect detection rate, man-hour cost, time, and functionality. Alternative implementations may include other data metrics as discovered or considered important by a project manager, including, for example, amount of incoming work, effort based on size of project, defect detection efficiency, defect injection rates, hiring and staff turnover rates, productivity and throughput.

In one implementation, the GSMBs are created or customized by a software developer expressly for a specific GPSM. In another, GSMBs are created or customized by a software developer according to that developer's particular software development practices. In another implementation, GSMBs are created or customized by third-parties and either purchased or otherwise acquired by a software developer for inclusion in a GPSM. In yet another implementation, GSMBs are introduced or modified to test the effects of a change in the process modeled by the GPSM, as is illustrated by the GPSM 200. The process of using the modular GSMBs to measure the effect of process changes is discussed in greater detail below in the discussion with respect to FIG. 6.

Figure 3:
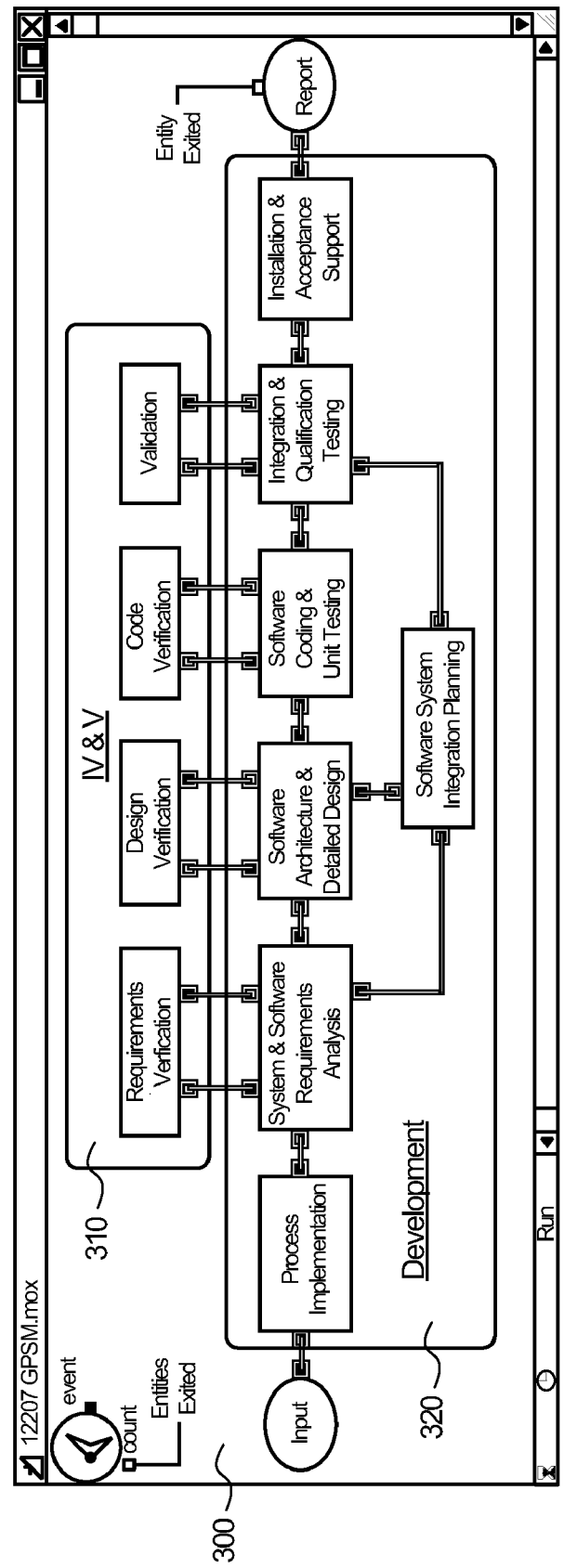
FIG. 3 illustrates, in one implementation, an exemplary generalized software process simulation model.

FIG. 3 illustrates, in one implementation, a GPSM 300 represented graphically within the Extend modeling tool. In the illustrated implementation, the IEEE 12207 standard software development lifecycle process 310, including subprocesses, has been augmented with an Independent Verification and Validation process 320. In one implementation, the IV&V process is created to provide a check on the operation of the main software development process and perform additional verification of process phases to reduce errors at delivery time. In the illustrated implementation, the IV&V process is intended to operate in tandem with the development process and utilizes inter-block connections to transfer data between the GSMBs which constitute the different processes. FIG. 3 illustrates how, in one implementation, a development standard, such as IEEE 12207, can be simulated using a GPSM. While in the illustrated implementation, only high-level process phases are shown to be simulated, in alternate implementations, lower-level processes are graphically shown. Additionally, in alternative implementations, high-level processes such as in FIG. 3 are shown until the user opens or expands one or more of the high-level processes to uncover lower-level processes and implementation. In the illustrated implementation the various processes of IV&V are tied to specific IEEE process phases in order to illustrate and take advantage of phase-specific verification details.

In one implementation, multiple types of lower-level GSMBs may be used to create GPSMs. GSMB types include, but are not limited to: development blocks which simulate product development and inject defects, inspection and testing blocks which detect defects, rework blocks which correct and inject defects, and joint review blocks which detect and correct defects. The injection of defects into the development stream is done in order to simulate naturally-occurring defects as a result of development error. Detection of defects is done to simulate the removal of bugs or other development errors as developing software is reviewed and corrected. In other implementations, blocks may exist which measure or create changes in time or cost of a project. Additionally, while more than one of the blocks illustrated inject or detect defects, alternate implementations may incorporate different simulations of how this is done. For example in one implementation, a block may inject defects according to the time spent on the process, and in another implementation a block may inject defects according to man-hours committed to a process, or the complexity of the process. Finally, while the blocks described above are particularly useful for the specific example of software engineering, similarly-structured blocks can be utilized in order to simulate hardware or systems engineering, or other product development.

3. Utilizing the GPSM System

Figure 4:
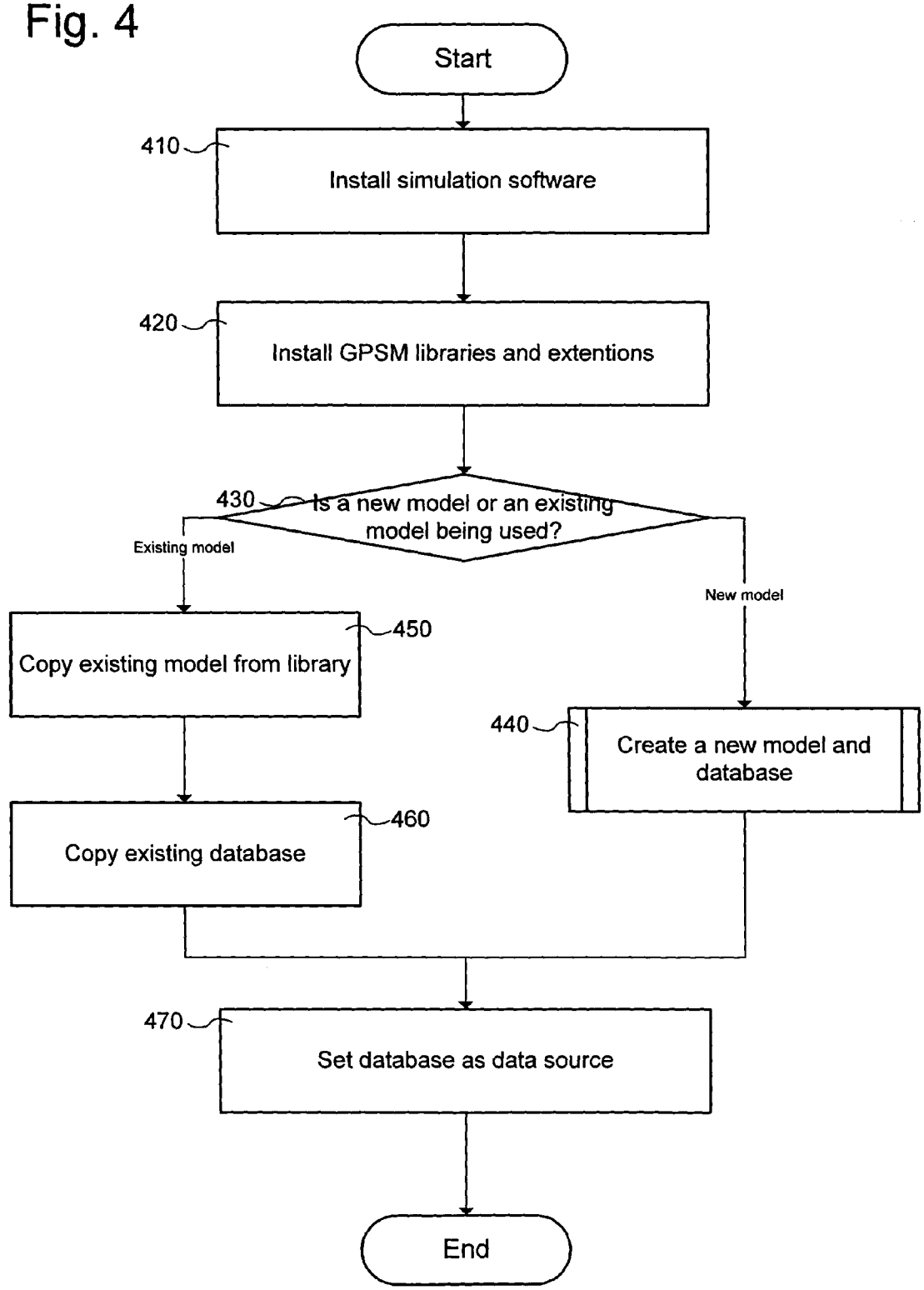
FIG. 4 illustrates a flowchart, representing an exemplary implementation of a process for installing and using the generalized software process simulation model system of FIG. 1.

FIG. 4 illustrates a flowchart which describes an exemplary implementation of a process for installing the GPSM system and creating or using a GPSM. In alternate implementations, the processes of FIG. 4 may be omitted, combined, or divided into separate subprocesses. The process illustrated in FIG. 4 begins at block 410, where the simulation software 130 on which the GPSM is designed and/or utilized is installed on the software development process simulation computer 100. In one implementation, installing the simulation software comprises a standard installation of the Extend simulation tool. The process continues to block 420, where GPSM libraries and extensions are installed on the software development process simulation computer 100. In one implementation, this installation comprises loading the various libraries and extensions into the memory used by the simulation software 130. In another implementation, the installation comprises indicating to the simulation software the location of the libraries and extensions that comprise the GPSM system. In one implementation, the libraries and extensions installed in the process of block 420 comprise files describing GPSMs and GSMBs. In another implementation, the libraries and extensions additionally comprise software which facilitates the parsing of parameter data from the development process database 120 and subsequent writing of report data to the database.

In decision block 430, it is determined whether or not a new simulation model is to be used in the GPSM system, or whether an already-existing one will be used instead. If a new model is to be created, the process continues to block 440, where a new GPSM and database are created. The process of creating a GPSM is described in further detail below in the discussion with respect to FIG. 5. If, however, it is determined that an already-existing model is to be used, the process continues to block 450, where an existing model is copied from the model and block library 110. In one implementation, this process comprises copying the model from the model and block library 110 into the memory or storage space of the software development process simulation computer 100. The process then continues to block 460, where the existing database which corresponds to the model copied in block 450 is copied. In one implementation, this process comprises copying a database file from the model and block library into the database 120. In another, the database is copied into the memory or storage of the software development process simulation computer 100. The process concludes in block 470, where the database is set in the simulation software as a data source for subsequent simulation.

Figure 5:
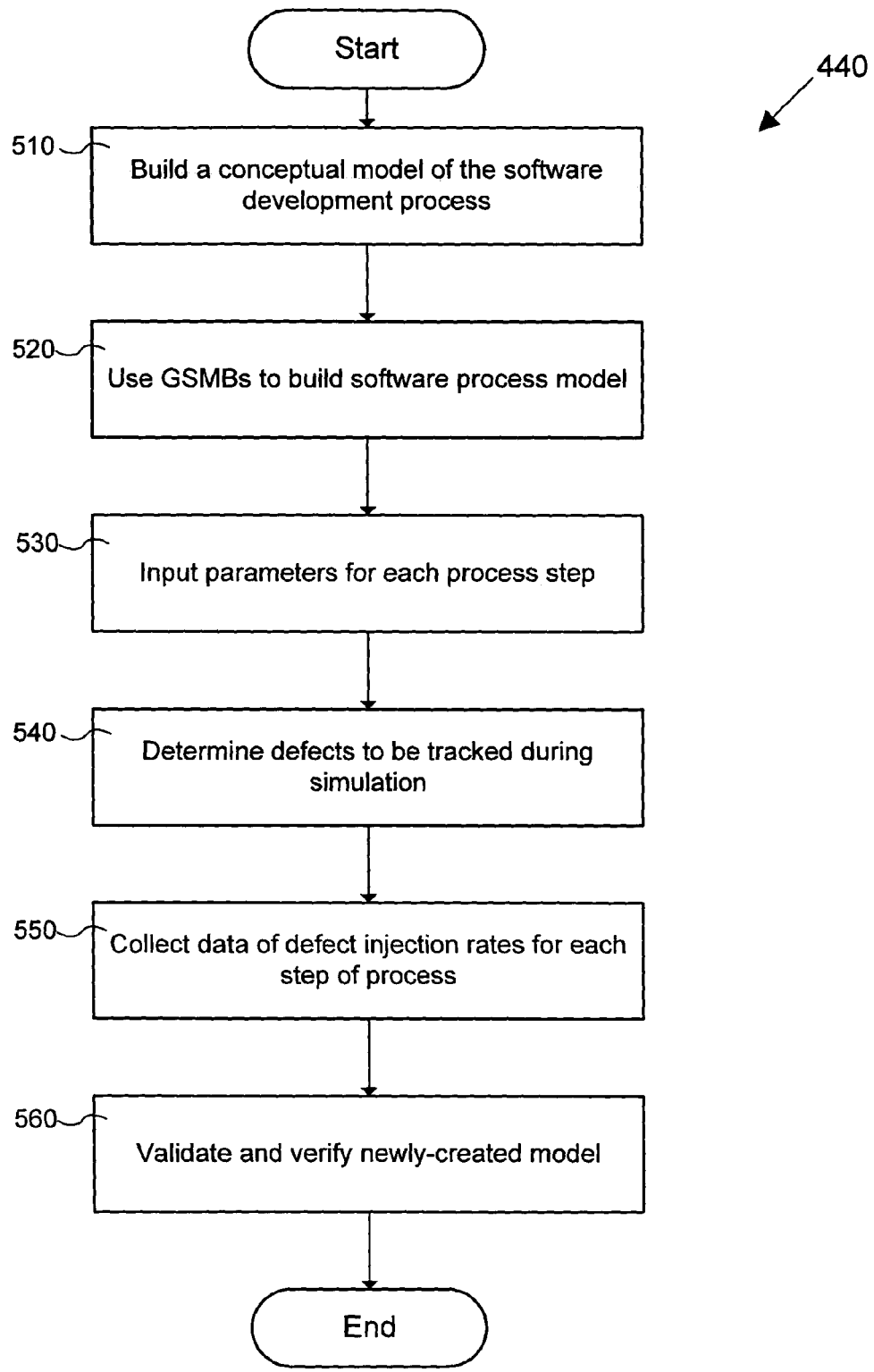
FIG. 5 illustrates a flowchart representing an exemplary implementation of a process for creating a new generalized software process simulation model.

FIG. 5 illustrates a flowchart which describes an exemplary implementation of a process for creating a GPSM. The process illustrated in FIG. 5 is particular to the situation of creating a GPSM used to measure quality metrics. In alternate implementations, GPSMs measuring different metrics may be created. In alternate implementations, the processes of FIG. 5 may be omitted, combined, or divided into separate subprocesses. In one implementation, the process of FIG. 5 describes the process of block 440 of FIG. 4.

The process starts at block 510, where a user builds a conceptual model of a software design process. In one implementation, this is done by choosing an SPSM that closely models the anticipated software development process for which a model is to be built. In another implementation, a conceptual model is developed based on the planned development activities, in order to test the efficacy of that plan. In another implementation, the process of FIG. 5 is used to modify an existing GPSM template for a particular engineering situation. In this situation, the process of block 510 can be omitted, if the template already matches the existing situation, obviating the need to build a conceptual model.

The process then continues to block 520, where GSMBs are used to build the software process model based on the conceptual model built at block 510. In one implementation, this process comprises utilizing pre-made GSMBs which have been developed to represent particular process steps, such as development, inspection, or testing. In another implementation, lower-level GSMBs representing lower-level activities, such as requirements inspection or code review, are connected to create higher-level GSMBs. In yet another implementation, this process involves modifying existing GSMBs out of a chosen template.

Next, the process continues to block 530, where parameters are input for each process step. In one implementation, the parameters are input through dialog boxes which each GSMB provides in order allow the user to affect the simulation characteristics of the GSMB. Examples of such dialog boxes are given below. In another implementation, the parameters input in block 530 are provided in the form of a spreadsheet, a database, or other data file or files. Exemplary input parameters include, but are not limited to: project, phase, and step identification, desired staff, effort, defect injection, detection, and correction rates, cost, and time.

The process then continues at block 530, where the user determines which defects will be tracked during simulations using the GPSM which is creating during the process. The process of determining defects to be tracked is of particular use when creating a GPSM which reports on quality metrics. In alternate implementations, such as when cost estimation models are created, a user may opt to omit defect tracking. In various implementations the defects to be tracked can include requirements defects, design defects, or coding defects (bugs). In alternate implementations, additional or alternate defects can be included or substituted.

Next, the process continues to block 540, where defect injection rates are collected for each step of the process. These defect injection rates indicate for a particular step in a model how many defects will be introduced into the simulated software product. In one implementations, this data collection comprises researching known or theoretical defect rates for a particular SPSM. In another implementation, defect injection rates are collected through inspection of historical data for the particular software developer or software development team. In yet another implementation, additional historical or theoretical data may be collected, including time, cost, or productivity measures.

Finally, in block 560, the newly-created model is validated and verified to determine that it properly simulates the software development process for which it has been created. In one implementation, this process involves running the model to ensure that it accurately represents the conceptual model built in block 510 and that it accurately represents any results received so far in the development process.

Figure 6:
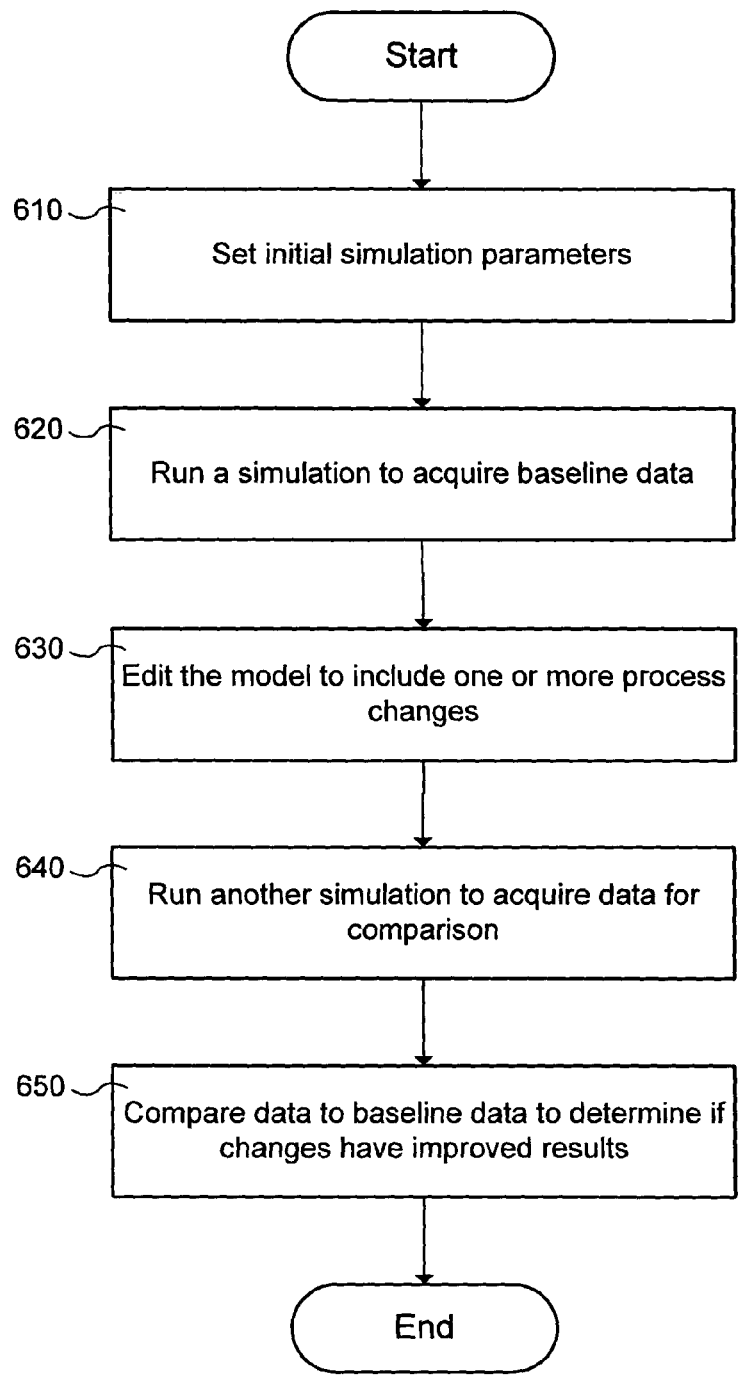
FIG. 6 illustrates a flowchart representing an exemplary implementation of a process for utilizing a generalized software process simulation model to determine the effects of a software process change.

FIG. 6 illustrates a flowchart which describes an exemplary implementation of a process for utilizing a chosen GPSM to investigate the results of a software process change to the chosen GPSM. By facilitating software process simulation using models composed of GSMBs, which are modular and easily modified, a user can easily represent potential changes in a software development process, and determine the outcome of these changes. In various implementations, the process illustrated in FIG. 6 can be used either in a planning stage, to determine a preferred software engineering plan, or during design or development, to track the progress of the engineering process and determine the likely outcome of modifying processes that have not yet occurred. In alternate implementations, the processes of FIG. 6 may be omitted, combined, or divided into separate subprocesses.

The process begins at block 610, where a user sets initial simulation parameters. In one implementation, this can include parameters such as, but not limited to, productivity, manpower resources, allocated process time, and feature count. In one implementation, these initial simulation parameters are chosen in order to utilize the GPSM to determine the result of changing their values. In another, they are chosen to provide a stable known base case in order to determine the effect of editing process steps or interactions between GSMBs in the GPSM. Next, at block 620, a simulation of the software development process modeled by the GPSM is performed in order to get baseline data about performance. As mentioned above, in various implementations, this baseline data can comprise time, cost, quality, or feature metrics. In alternate implementations, additional metrics can be represented in the baseline data.

Next, the process continues to block 630, where the GPSM is modified to include one or more process changes. In one implementation, this modification comprises changing one or more simulation parameters, either through dialog boxes for the various GSMBs of the GPSM, or through changes in parameters recorded in development process database 120. In another, this modification comprises the addition of one or more GSMBs, such as the addition of the blocks of the IV&V process 310 illustrated in FIG. 3. In yet another, this modification comprises the removal of one or more process steps by removing one or more GSMBs. In another implementation, one or more GSMBs are configured not to run to allow for data comparisons. Next, the process continues to block 640, where a second simulation is run to acquire data for comparison. The baseline data and newly-acquired data are then compared in block 650 to determine if any metrics demonstrate improved results. In one implementation, this comparison process comprises creating a report which allows quantitative comparison of results.

4. Interaction with GPSMs and GSMBs

FIG. 7 represents an exemplary data report 700 illustrating, in one implementation, changes in output data based on changes in a GPSM. In FIG. 7, various data metrics are reported, including total effort, rework effort, project duration, and corrected and latent defects. In alternate implementations, other output data can alternately reported, such as productivity, cycle-time, defect level, staffing level, staff utilization rate, and queue lengths. The report in FIG. 7 illustrates one particular use of GPSMs, as it shows data collected from a GPSM similar to that of FIG. 2, both with and without utilization of the IV&V process illustrated in FIG. 3. In one implementation, this data is obtained by running simulations with and without specific process blocks included in the GPSM, as in the process illustrated in FIG. 6. In various implementations, reports can be created to report model results at different levels for an overall project, for a lifecycle phase, or for individual process steps as a user desires.

FIG. 7 also illustrates that GPSMs can deliver differing forms of data, here including means and standard deviations of each of the metrics. Using information such as this from a GPSM, a project manager could determine, for example, whether the trade-off between increased duration and decreased latent defects suggested use of the IV&V process or not. While the illustrated implementation demonstrates a tabular output format, in alternate implementations, output data from a GPSM simulation may be displayed in various other implementations, including, but not limited to: graphical formats, probability density functions, probability distributions, cumulative distribution functions, and cumulative frequency distributions.

Figure 8:
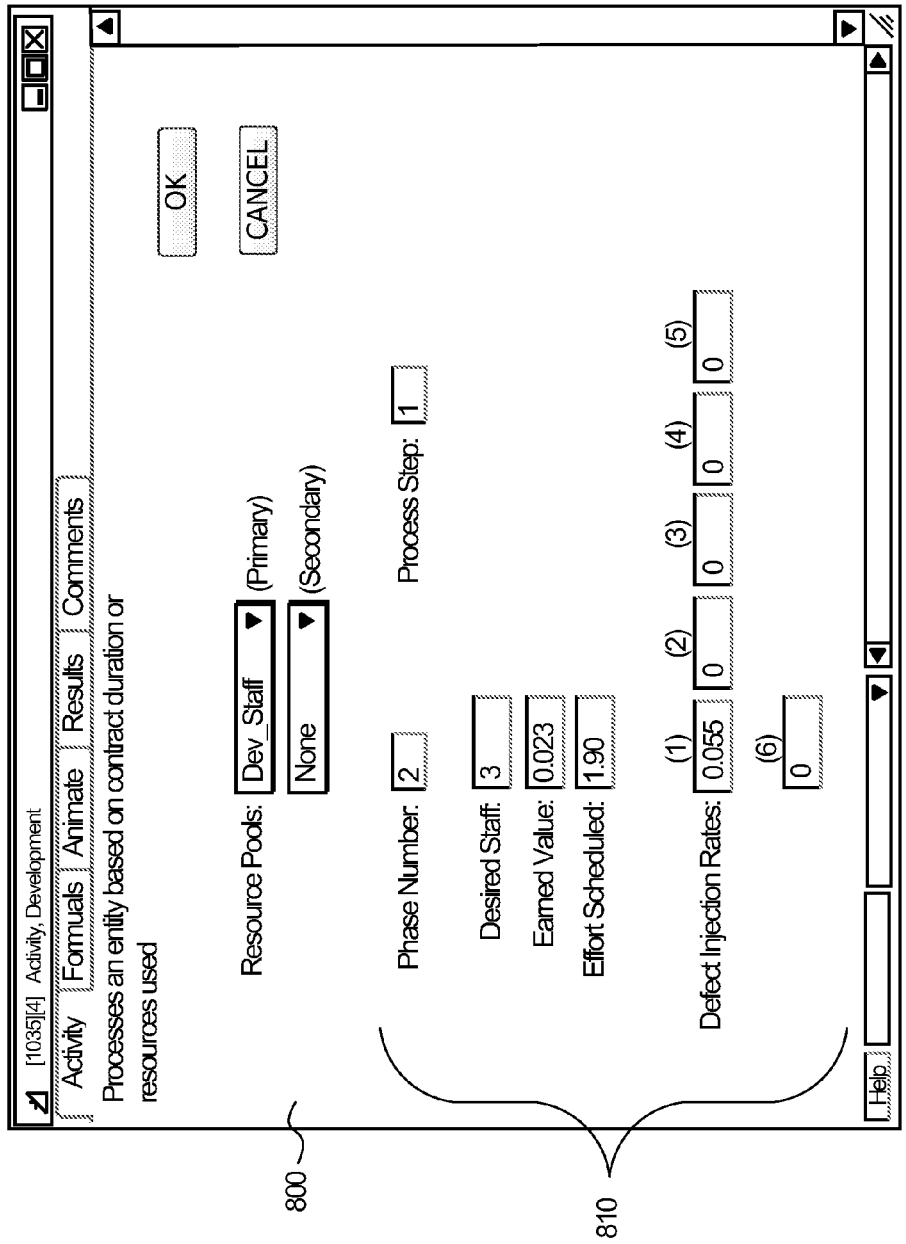
FIG. 8 illustrates, in one implementation, an interface for manipulating settings for a generic software engineering development block.
Figure 9:
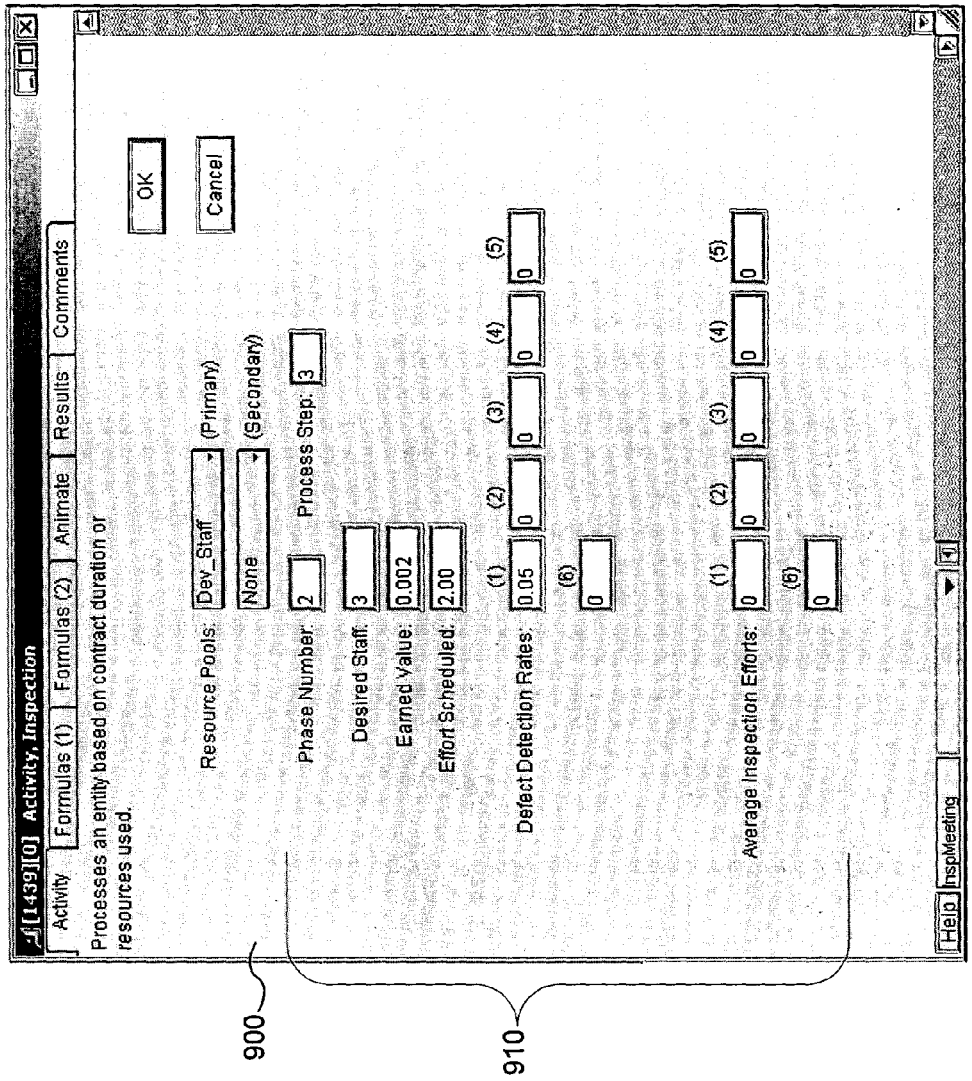
FIG. 9 illustrates, in one implementation, an interface for manipulating settings for a generic software engineering inspection block.
Figure 10:
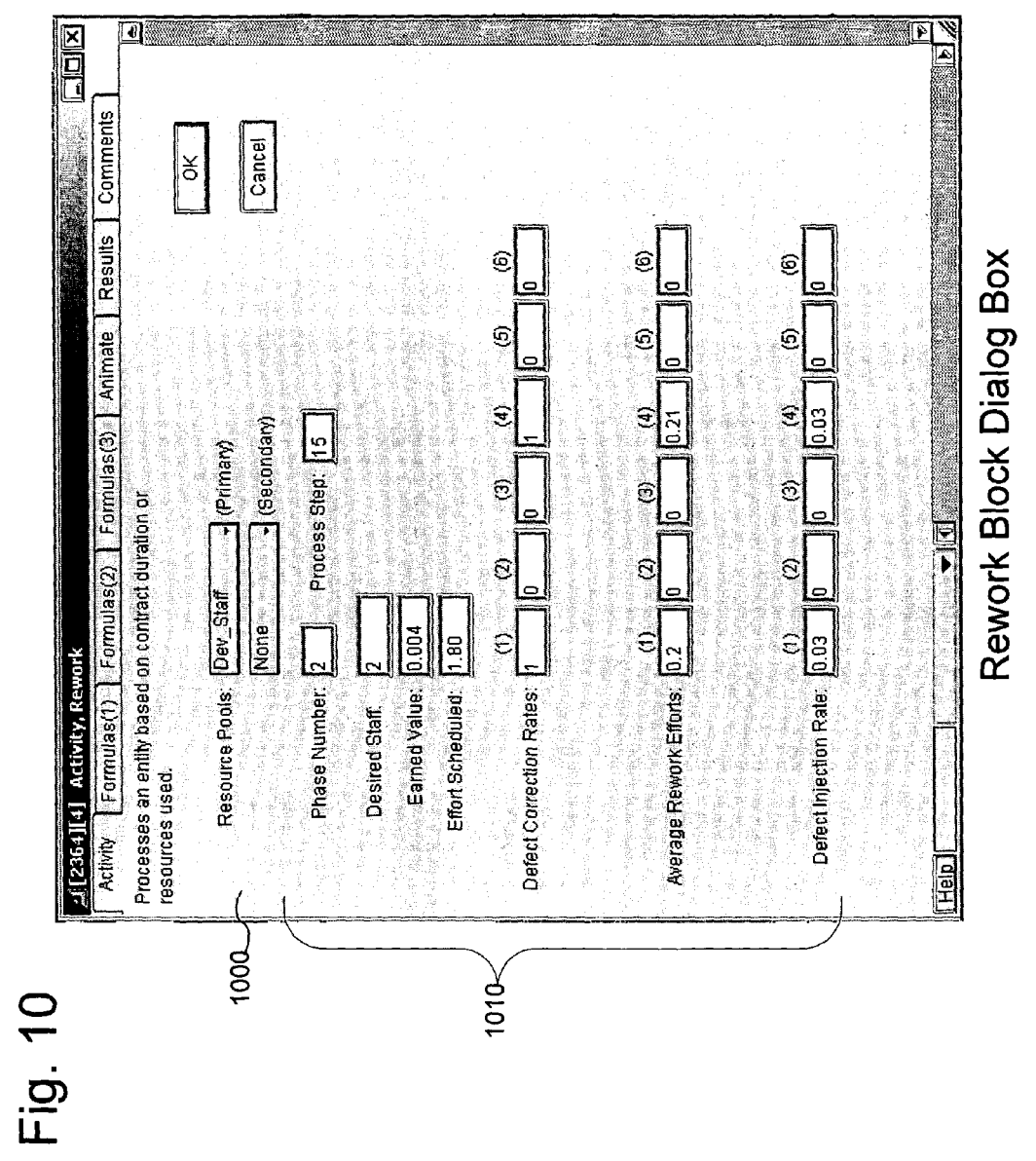

FIGS. 8, 9, and 10 illustrate that GSMBs, in one implementation, incorporate the ability to produce dialog boxes which can be used to enter or modify various simulation parameters or inputs. FIG. 8 illustrates one implementation of a dialog box 800 for a development block. FIG. 8 illustrates entry forms 810 allowing a user to adjust parameters such as staff numbers, the quantitative effort that will be simulated by the block when it simulates its development process, and the rate of defect injection the block will simulate. FIG. 9 illustrates one implementation of a dialog box 900 for an inspection block. FIG. 9 illustrates entry forms 910 allowing a user to adjust parameters such as staff numbers, scheduled effort, defect detection rates, and inspection effort. FIG. 10 illustrates one implementation of a dialog box 1000 for an inspection block. FIG. 10 illustrates entry forms 1010 allowing a user to adjust parameters such as defect correction, rework efforts, and defect injection.

Figure 11:
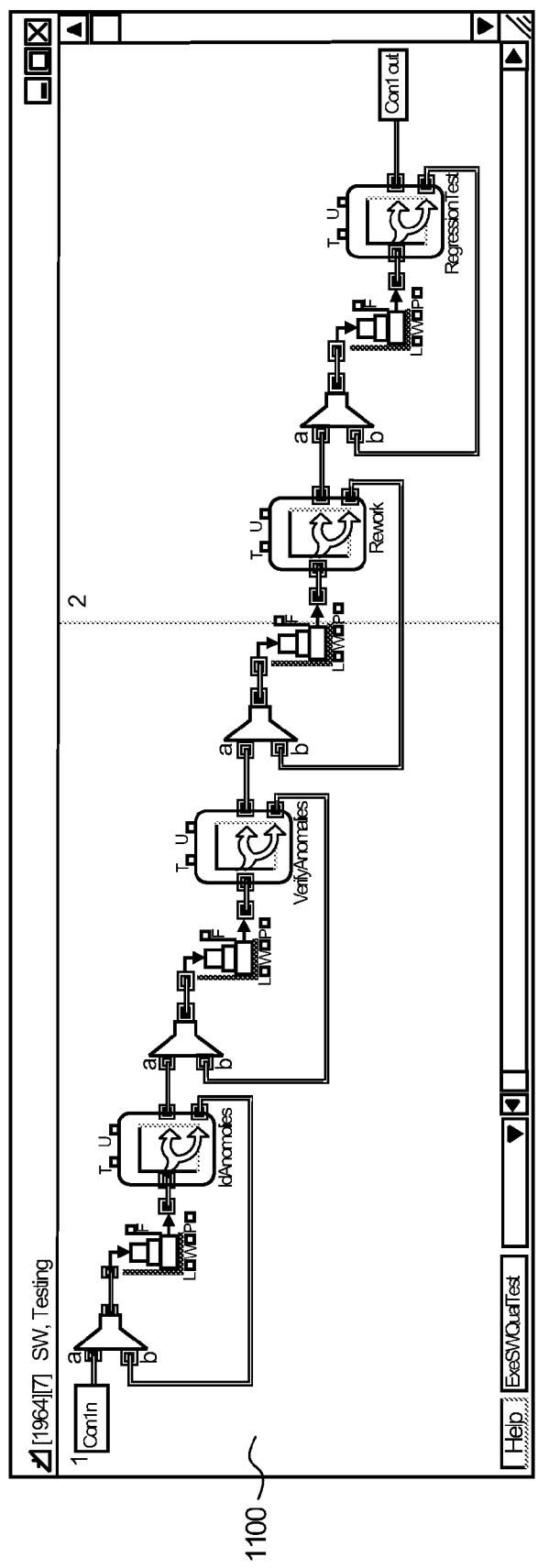
FIG. 11 illustrates, in one implementation, an expanded view of the component locks of a generic software engineering testing block.

FIG. 11 illustrates one implementation of a testing block 1100 which simulates a process that comprises multiple activities. In the illustrated implementation, these activities are themselves represented by GSMBs which can themselves be further adjusted to customize the higher-level testing process represented by the testing block. The various blocks comprising the illustrated testing block implementation show a simulated process that includes identification of anomalies in a piece of code, verification of the anomalies, rework to solve the problems, and then regression testing to verify that the problems have been solved. As FIG. 11 illustrates, some sub-processes can be set up to occur multiple times or to rely on the output of a process. In one implementation, the GSMBs are configured to expand when a user selects them and opts to see an expanded view of the process simulated by a GSMB. This allows a user to modify and inspect the GPSM at varying degrees of granularity, depending on his or her needs.

In another implementation of the GSMBs, not illustrated, a dialog box is created which allows manipulation of equations associated with a particular block. In another implementation, a dialog box may be used which can adjust many GSMBs simultaneously, either by adjusting data or by adjusting equations. In the illustrated implementation, a user is able to directly manipulate equations which utilize variables. In another implementation, some equations or data may be protected from change, or even viewing, by the GSMB creator, either to prevent simulation errors or to protect trade secrets used in the development of the GSMB.

In one implementation, a spreadsheet used to hold data for a GPSM. In one implementation, data is taken from a spreadsheet in order to populate a GPSM with the data it needs to simulate a software development process. In another implementation, a GPSM will populate a spreadsheet with data to form a report which may be analyzed by a project manager. In one implementation, data metrics are reported for various stages and runs of simulation, providing a wealth of data which can aid the project manager in making decisions. In another implementation, the writing to or reading from the spreadsheet is performed by special GSMBs which are configured to generate reports for a user. In another implementation, databases are used instead of spreadsheets for data management. Should data need to be represented on a spreadsheet, in this implementation data can be acquired from the database and used to create a reporting spreadsheet.

5. GPSM Advantages

While the advantages discussed herein are done with an eye toward the particular example of software engineering, it should be recognized that similar advantages exist for other product or technology development projects with characteristics similar to software engineering, including hardware and systems engineering.

One advantage of the use of GPSMs is increased interest by the software development industry of SPSMs for reasons of cost. GPSMs generally save money over the use of traditional software design modeling systems by allowing for the reuse of models or sections of models. In one implementation, this allows a developer to create a library of software models which can be chosen from when starting a new development project. Additionally, because the models are created from generic building blocks and can be defined to different degrees both by modifying blocks and by modifying input data, in one implementation GPSMs lend themselves to being shared or sold between developers or by third-parties, as generic tools. In one implementation, this is done by a developer that takes an existing software engineering model and "generifies" it by removing trade secret or other specific information before selling or offering it to another developer. In another implementation, a third-party software development tools manufacturer may invest time and money into developing a fleet of GPSMs for various uses, which can then be sold to software developers. In yet another implementation, a third-party may utilize GPSMs that it creates, either alone, or in tandem with a software developer, to aid software developers in improving their development processes.

The creation of generalized models comprising generic building blocks addresses several issues normally raised when making the case for developing software using SPSMs. First, the ease of use of GPSMs make the use of SPSMs easier to justify on a cost-benefit analysis when compared to costs they prevent. Because GPSMs offer readily-customizable (or quickly-built) software design models, the time and manpower used to create such models is drastically reduced. These can be compared with the cost associated with making poor process change decisions, such as increased development time, compromised product quality, or straightforward monetary development cost. When this comparison is made by a project manager, the decision to utilize these lower-cost models are more likely to be made than with other SPSM systems.

Additionally, in another implementation GPSMs can support project managers during the run of a software development project. Once a project manager has created or adapted a GPSM to his or her specific project, he or she can use that GPSM to provide up-to-date information about expected project results as development parameters change. For example, if a project manager discovers that a given development stage has underperformed, he or she can modify the data flowing through the GPSM in order to see realistic predictions about project outcomes. This, in turn, can allow a project manager to make needed decisions about resource reallocation in order that the development project can remain on track. In one implementation, predictions are done on a short-term basis, with a project manager making predictions about outputs and requirements for particular project stages or processes. In another implementation, predictions are performed for the entire project.

6. Computing Environment

The above described simulation software 130 and GPSM (illustrated as software simulation model 140) can be implemented on any of a variety of computing devices and environments, including computers of various form factors (personal, workstation, server, handheld, laptop, tablet, or other mobile), distributed computing networks, and Web services, as a few general examples. The simulation software 130 and GPSM can be implemented in hardware circuitry, as well as in compiling or runtime software executing within a computer or other computing environment, such as shown in FIG. 12.

Figure 12:
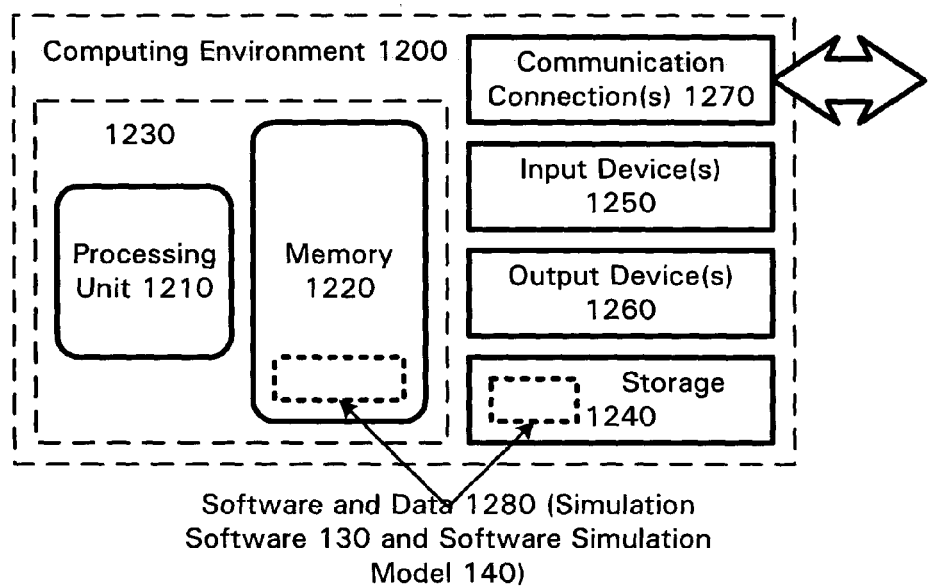
FIG. 12 is a diagram depicting a generalized example of a suitable computing environment in which the described techniques can be implemented.

FIG. 12 illustrates a generalized example of a suitable computing environment 1200 in which the described techniques can be implemented. The computing environment 1200 is not intended to suggest any limitation as to scope of use or functionality of the invention, as the present invention may be implemented in diverse general-purpose or special-purpose computing environments.

With reference to FIG. 12, the computing environment 1200 includes at least one processing unit 1210 and memory 1220. In FIG. 12, this most basic configuration 1230 is included within a dashed line. The processing unit 1210 executes computer-executable instructions and may be a real or a virtual processor. In a multi-processing system, multiple processing units execute computer-executable instructions to increase processing power. The memory 1220 may be volatile memory (e.g., registers, cache, RAM), non-volatile memory (e.g., ROM, EEPROM, flash memory, etc.), or some combination of the two. In one implementation, the memory 1220 stores software and data 1280 implementing the simulation software 130 and GPSM.

A computing environment may have additional features. For example, the computing environment 1200 includes storage 1240, one or more input devices 1250, one or more output devices 1260, and one or more communication connections 1270. An interconnection mechanism (not shown) such as a bus, controller, or network interconnects the components of the computing environment 1200. Typically, operating system software (not shown) provides an operating environment for other software executing in the computing environment 1200, and coordinates activities of the components of the computing environment 1200.

The storage 1240 may be removable or non-removable, and includes magnetic disks, magnetic tapes or cassettes, CD-ROMs, CD-RWs, DVDs, or any other medium which can be used to store information and which can be accessed within the computing environment 1200. In one implementation, the storage 1240 stores instructions and data for the simulation software 130 and GPSM.

The input device(s) 1250 may be a touch input device such as a keyboard, mouse, pen, or trackball, a voice input device, a scanning device, or another device that provides input to the computing environment 1200. For audio, the input device(s) 1250 may be a sound card or similar device that accepts audio input in analog or digital form, or a CD-ROM reader that provides audio samples to the computing environment. The output device(s) 1260 may be a display, printer, speaker, CD-writer, or another device that provides output from the computing environment 1200.

The communication connection(s) 1270 enable communication over a communication medium to another computing entity. The communication medium conveys information such as computer-executable instructions, audio/video or other media information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The GPSMs herein can be described in the general context of computer-readable media. Computer-readable media are any available media that can be accessed within a computing environment. By way of example, and not limitation, with the computing environment 1200, computer-readable media include memory 1220, storage 1240, communication media, and combinations of any of the above.

The techniques herein can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "create," and "analyze" to describe computer operations in a computing environment. These terms are high-level abstractions for operations performed by a computer, and should not be confused with acts performed by a human being. The actual computer operations corresponding to these terms vary depending on implementation.

In view of the many possible implementations to which the principles of our invention may be applied, we claim as our invention all such implementations as may come within the scope and spirit of the following claims and equivalents thereto.

I claim:

1. A method of modeling a software engineering process, executed by a central processing unit (CPU), the method comprising:

accessing a plurality of application-customizable generic software engineering building blocks, the blocks displayed within simulation software;

selecting at least one generic building block within the simulation software, the generic building block simulating a process which comprises multiple activities and comprising multiple generic building blocks which each simulate an activity in the process;

selecting at least one of the generic building blocks which simulate an activity from the generic building block which simulates a process, wherein said at least one generic building block simulates a stage of a software engineering process life cycle according to one or more equations relating at least one of time and unit cost of staff to at least the following product engineering metrics: defect introduction rate, defect detection rate and feature count;

wherein the plurality of application-customizable generic software engineering building blocks support a base set of attributes comprising: defect introduction rate, defect detection rate, staff turnover, productivity, and man-hour cost; and wherein the plurality of application-customizable generic software engineering building blocks are configurable using, at least in part, the base set of attributes to implement block types comprising:

development blocks, which simulate software product development and inject defects;

inspection and testing blocks, which detect defects;

rework blocks, which correct and inject defects; and
joint review blocks, which detect and correct defects; and
manipulating the selected at least one generic building block which simulates an activity within the simulation software to create a model of a software engineering process.

2. The method of claim 1, wherein at least one of the plurality of generic building blocks receives input data and at least one generic building block produces output data.

3. The method of claim 2, wherein at least one of the plurality of generic building blocks performs a mathematical calculation on input data to create output data.

4. The method of claim 3, wherein manipulating the selected at least one generic building block comprises changing at least one generic building block mathematical calculation to model the software design process.

5. The method of claim 2, wherein:
selecting at least one generic building block comprises selecting two or more blocks; and
manipulating the selected at least one generic building block comprises manipulating the selected two or more blocks so that the output produced by one block becomes the input received by another block.

6. The method of claim 1, further comprising utilizing the created model to predict software engineering performance.

7. The method of claim 6, wherein predicting software engineering performance further comprises:
creating metric data for time, cost or quality for the model;
performing a modification to data or a generic building block to modify the behavior of the model;
creating new metric data; and
comparing the newly-created data to the original data to determine the cost or benefit of the modification.

8. The method of claim 1, further comprising:
writing textual descriptions of software engineering processes; and
associating the written textual descriptions with generic building blocks;
such that the model contains a textual description of its component blocks.

9. A method of modeling a software engineering process, executed by a central processing unit (CPU), the method comprising:
accessing a software engineering process model comprising a plurality of application-customizable generic software engineering building blocks implemented within simulation software; and
creating a new software engineering process model by manipulating at least one generic software engineering building block which represents a software engineering activity and is contained in another generic software engineering block within the simulation software; wherein the at least one generic software engineering building block simulates a stage of a software product engineering life cycle according to one or more equations relating at least one of time and unit cost of staff to at least the following product engineering metrics: defect introduction rate, defect detection rate and feature count;
wherein the plurality of application-customizable generic software engineering building blocks support a base set of attributes comprising: defect introduction rate, defect detection rate, staff turnover, productivity, and man-hour cost; and
wherein the plurality of application-customizable generic software engineering building blocks are configurable using, at least in part, the base set of attributes to implement block types comprising:
development blocks, which simulate software product development and inject defects;
inspection and testing blocks, which detect defects;
rework blocks, which correct and inject defects; and
joint review blocks, which detect and correct defects.

10. The method of claim 9, wherein the accessed software engineering process model conforms to an IEEE 12207 software design standard or a waterfall, or a rational unified process software design model.

11. The method of claim 9, wherein manipulating at least one generic software engineering building block comprises:
selecting a building block that performs a mathematical calculation; and
modifying the mathematical calculation.

12. The method of claim 9, further comprising:
selecting, from a library of application-customizable generic software engineering building blocks, at least one new generic building block; and
adding the selected generic building block to the software engineering process model to create a different model.

13. The method of claim 12, wherein the selected generic building block is configured to process software engineering data and wherein adding the selected block comprises manipulating the selected block so that it either receives software engineering data from another block in the accessed model, produces data for another block in the accessed model, or both.

14. The method of claim 9, further comprising:
selecting, from the accessed model, at least one generic building block; and
removing the selected block from the model to create a different model.

15. The method of claim 9, further comprising utilizing the new model to predict software engineering performance.

16. A computer system for estimating combinations of time, cost, quality, or functionality metrics of engineering a product through modeling a software product engineering process, the computer system comprising:
a memory storing a library comprising a plurality of application-customizable generic software engineering building blocks (hereafter "blocks") to be displayed in a graphical user interface of simulation software, the blocks configured to process product engineering data, and to allow direct manipulation of the blocks while displayed in a modeling environment provided by the simulation software, wherein at least one block out of the blocks is configured to allow direct manipulation of a modeled product engineering activity which is contained in the modeled software product engineering process, wherein at least one block out of the blocks simulates a stage of a software product engineering life cycle according to one or more equations relating at least one of time and unit cost of staff to at least the following product engineering metrics: defect introduction rate, defect detection rate and feature count;
wherein the plurality of application-customizable generic software engineering building blocks support a base set of attributes comprising: defect introduction rate, defect detection rate, staff turnover, productivity, and man-hour cost; and
wherein the plurality of application-customizable generic software engineering building blocks are configurable using, at least in part, the base set of attributes to implement block types comprising:

development blocks, which simulate software product development and inject defects;
inspection and testing blocks, which detect defects;
rework blocks, which correct and inject defects; and
joint review blocks, which detect and correct defects; and a display for displaying the graphical user interface of the simulation software for the modeling environment; and a processor configured to execute the simulation software to model the software product engineering process as an arrangement constructed of plural of the generic software engineering building blocks from the library, and present the graphical user interface on the display having user manipulable controls to effect said direct manipulation of the blocks in the modeling environment displayed in the graphical user interface.

17. The computer system of claim 16, wherein:
the product engineering data is software engineering data.

18. The computer system of claim 17, further comprising a modeling environment for manipulating the generic software engineering process model blocks to model a software engineering process.

19. The computer system of claim 17, wherein at least one of the plurality of blocks is configured to accept software engineering data as an input and at least one of the plurality of blocks is configured to produce software engineering data as an output.

20. The computer system of claim 19, wherein at least one of the plurality of blocks is configured to accept software engineering data directly from at least one of the plurality of blocks that is configured to produce software engineering data.

21. The computer system of claim 20, wherein at least one of the plurality of blocks is configured to perform a mathematical calculation on input data to create output data.

22. The computer system of claim 20, wherein at least one of the plurality of blocks is configured to contain at least one sub-block, the sub-block comprising an application-customizable generic software engineering building block.

23. The computer system of claim 22, wherein at least one of the plurality of blocks is configured to contain multiple sub-blocks, the sub-blocks comprising application-customizable generic software engineering building blocks.

24. The computer system of claim 23, wherein the at least one of the plurality of blocks that is configured to contain multiple sub-blocks represents a process with a plurality of sub-processes and wherein the sub-blocks represent sub-processes.

25. The computer system of claim 23, wherein the at least one of the plurality of blocks that is configured to contain multiple blocks is further configured:
to accept software engineering data; and
to pass software engineering data to a sub-block contained within itself for processing.

26. The computer system of claim 23, wherein the at least one of the plurality of blocks that is configured to contain multiple blocks is further configured:
to accept software engineering data from a sub-block contained within itself; and
to produce software engineering data.

27. The computer system of claim 23, wherein at least two blocks represent different levels of the software product engineering process.

28. The computer system of claim 20, wherein blocks are configured to be associated with each other without modification on the part of a user.

29. The computer system of claim 19, wherein at least one of the plurality of blocks is further configured to retrieve data from a database or spreadsheet file.

30. The computer system of claim 19, wherein at least one of the plurality of blocks is further configured to accept data from user inputs.

31. The computer system of claim 19, wherein at least one of the plurality of blocks is further configured to write data to a database or spreadsheet file.

32. The computer system of claim 19, wherein at least one of the plurality of blocks is further configured to produce a user-readable output.

33. The computer system of claim 19, wherein configured to allow manipulation in a modeling environment comprises:
if the block performs a mathematical calculation, the block being configured for the simulation software to present a calculation editing dialog in the graphical user interface, the dialog presenting a textual representation of the mathematical calculation and controls allowing a user to textually edit the mathematical calculation.

34. The computer system of claim 19, wherein at least one block corresponds to a requirements analysis or design process.

35. The computer system of claim 19, wherein at least one block corresponds to a software coding process.

36. The computer system of claim 19, wherein at least one block corresponds to a testing or inspection process.

37. The computer system of claim 1, wherein the plurality of application-customizable generic software engineering building blocks support simulating the stage of the software product engineering life cycle by modeling the product engineering metrics based on a plurality of defect types, wherein the plurality of defect types comprise: requirements defects, design defects, and coding defects.

38. A computer-readable storage medium containing software data structures which, when read by a computer, describe a plurality of application-customizable generic software engineering building blocks (hereafter "blocks"), which, when read by simulation software, cause the simulation software to simulate a software product engineering process defined by the blocks and which are able to be manipulated within a graphical user interface of the simulation software by a user, wherein the blocks describe processes measured by cost, time, quality or functionality; wherein at least one software engineering building block contains a different software engineering building sub-block, the sub-block comprising an application-customizable generic software engineering building block and representing a product engineering activity, the sub-block causing the simulation software to simulate a stage of a software product engineering life cycle according to one or more equations relating at least one of time and unit cost of staff to at least the following product engineering metrics: defect introduction rate, defect detection rate and feature count;

wherein the plurality of application-customizable generic software engineering building blocks support a base set of attributes comprising: defect introduction rate, defect detection rate, staff turnover, productivity, and man-hour cost; and wherein the plurality of application-customizable generic software engineering building blocks are configurable using, at least in part, the base set of attributes to implement block types comprising:

development blocks, which simulate software product development and inject defects;

inspection and testing blocks, which detect defects;

rework blocks, which correct and inject defects; and joint review blocks, which detect and correct defects.

39. The computer-readable medium of claim 38, wherein the plurality of software engineering building blocks comprise a library of blocks which can be selected from to create a model of a software engineering process.

40. The computer-readable medium of claim 38, wherein at least one software engineering building block represents a process which is generic to a plurality of software engineering models.

41. The computer-readable medium of claim 38, wherein at least one software engineering building block contains a different software engineering building sub-block, the sub-block comprising an application-customizable generic software engineering building block.

42. The computer-readable medium of claim 38, wherein the software engineering process model conforms to an IEEE 12207 software design standard.

43. The computer-readable medium of claim 38, wherein the software engineering process model conforms to a waterfall or rational unified process software design model.

* * * * *

UNITED STATES PATENT AND TRADEMARK OFFICE
CERTIFICATE OF CORRECTION

| | | |
|---|---|---|
| PATENT NO. | : 7,890,924 B2 | Page 1 of 1 |
| APPLICATION NO. | : 10/838494 | |
| DATED | : February 15, 2011 | |
| INVENTOR(S) | : David Raffo | |

It is certified that error appears in the above-identified patent and that said Letters Patent is hereby corrected as shown below:

Column 1,
Line 8, "filed of Jan." should be --filed Jan.--

Column 3,
Line 36, "settings or a" should be --settings for a--
Line 39, "component locks" should be --component blocks--

Column 18,
Line 29, "claim 1" should be --claim 16--

Signed and Sealed this
Twenty-seventh Day of December, 2011

David J. Kappos
*Director of the United States Patent and Trademark Office*